UNITED STATES PATENT OFFICE.

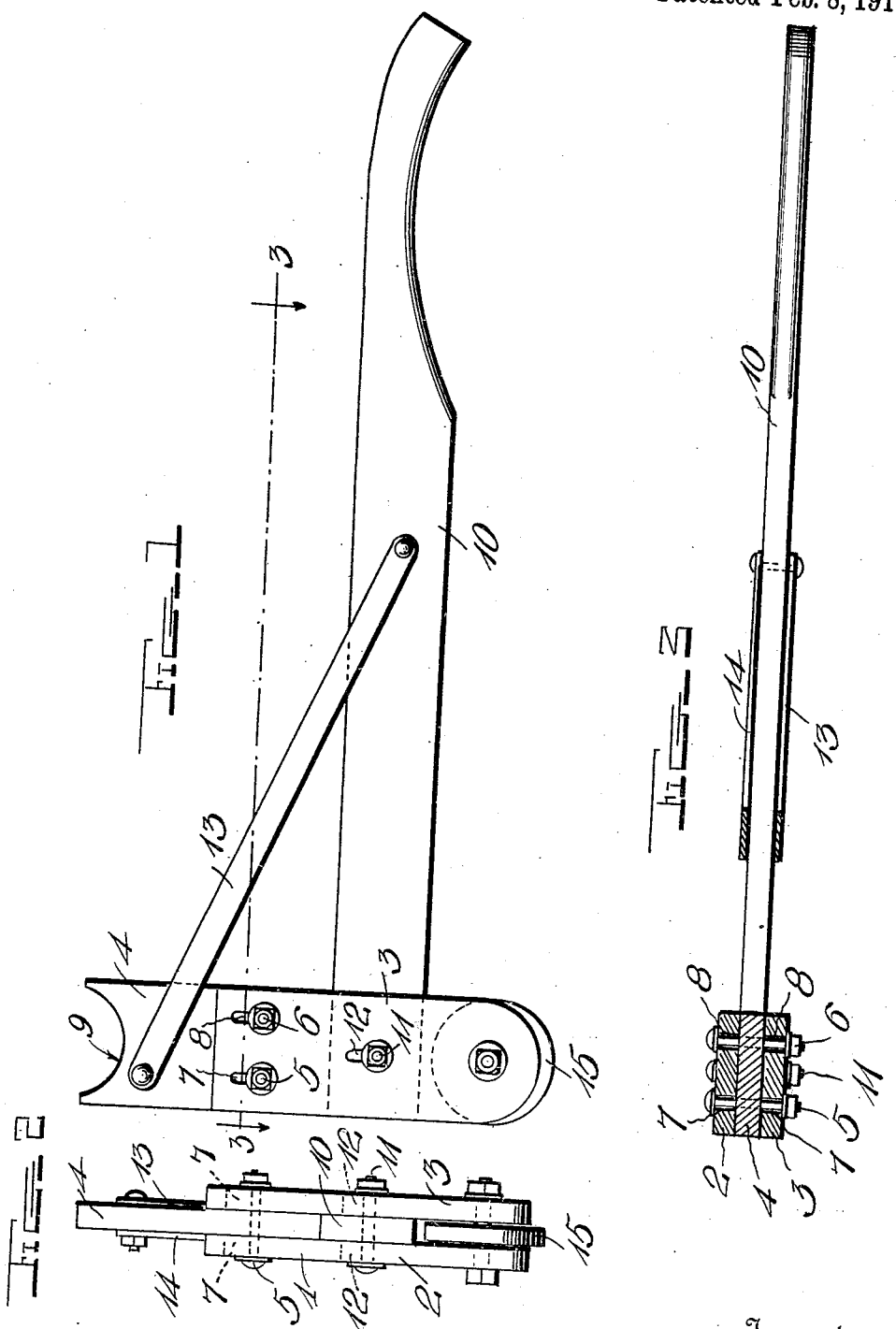

JOSEPH E. MORSE, OF SPRINGFIELD, VERMONT.

LIFTING-JACK.

948,517.  Specification of Letters Patent.  Patented Feb. 8, 1910.

Application filed July 19, 1909. Serial No. 508,287.

*To all whom it may concern:*

Be it known that I, JOSEPH E. MORSE, a citizen of the United States, residing at Springfield, in the county of Windsor and State of Vermont, have invented certain new and useful Improvements in Lifting-Jacks; and I do declare the following to be a full, clear, and exact description of the invention, such as will enable others skilled in the art to which it appertains to make and use the same.

This invention relates to jacks for raising vehicles and the object thereof is to provide a simply constructed, strong and efficient device of this character for raising the wheels or axles of vehicles and is especially designed for automobiles to relieve the tires of the weight of the machine when the car is standing in garage one of the jacks being placed to support each wheel.

With this and other objects in view, the invention consists of certain novel features of construction, combination and arrangement of parts as will be more fully described and particularly pointed out in the appended claim.

In the accompanying drawings; Figure 1 represents a side elevation of this improved lifting jack; Fig. 2 represents an end view thereof; and, Fig. 3 is a transverse section taken on the line 3—3 of Fig. 1.

In the embodiment illustrated an upright supporting member 1 is shown composed of two laterally spaced bars 2 and 3 of any suitable material and of any desired width and thickness. An axle engaging member 4 is mounted between the upper ends of the bars 2 and 3 and is secured in position by means of bolts 5 and 6 which extend through transversely spaced slots 7 and 8 which are arranged longitudinally of the side bars 2 and 3 and are designed to permit the vertical adjustment of the member 4 to adapt the jack to fit vehicles having axles disposed different heights from the ground or other supporting surface. The upper end of the member 4 is preferably cut out to form a rounded recess 9 to receive the axle and hold it against lateral movement. A lever 10 has one end thereof disposed between the bars 2 and 3 and extends laterally at right angles thereto and the upper edge of said lever preferably abuts against the lower end of the member 4. This lever 10 is secured to the bars 2 and 3 by means of a bolt 11 which extends through registering slots as 12 arranged longitudinally in the side bars 2 and 3 and which provide for the vertical adjustment of said lever to correspond with the adjustment of the member 4 whereby the upper edge of the lever is always held in abutting engagement with the lower end of the member 4. Braces 13 and 14 are connected at one end to the upper end of the member 4 on opposite sides thereof as is clearly shown in Fig. 2 and at their other end to the lever 10 at a point about midway the length thereof, said lever being arranged between said braces. A wheel or roller 15 is revolubly mounted between the lower ends of the bars 2 and 3 with the periphery thereof projecting slightly below said ends to provide for the ready movement of the jack over the ground or other supporting surface. The main portion of the wheel is arranged between the bars 2 and 3 and is braced thereby and all danger of the wheel bending laterally or breaking under a heavy weight is avoided. The member 4 and the lever 10 serve as spacing blocks for the bars 2 and 3 and prevent all danger of binding of the wheel thereby insuring its ready revolution at all times.

In the operation of this jack when the vehicle is to be lifted the free outer end of the handle or lever 10 is raised thereby lowering the free end of the member 4 until the recess 9 therein is engaged with the axle or hub of the wheel to be supported. The handle is then pressed down into the position shown in Fig. 1 forcing the wheel carried by the member 4 upward out of contact with the supporting surface. It will be obvious that one of these jacks is to be used to support each wheel of a machine and they are constructed as above described to provide the necessary strength for supporting vehicles of the character for which they are designed.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

I claim as my invention;

A lifting jack comprising two laterally spaced side members having a wheel rotatably mounted between the lower ends thereof, an axle engaging member disposed between said bars with its upper end projecting thereabove and provided with an axle engaging recess, longitudinally extending registering slots arranged in said side bars, bolts extending through said axle supporting member and through the slots in said side bars, a lever having one end arranged between said side bars with its upper edge abutting the lower end of said axle supporting member, a bolt extending through said lever and through two of the registering slots in said side bars and brace bars connected at one end to the upper end of said axle engaging member on opposite sides thereof and at their other ends to the lever on opposite sides thereof.

In testimony whereof I have hereunto set my hand in presence of two subscribing witnesses.

JOSEPH E. MORSE.

Witnesses:
LEROY A. WHITNEY,
JUNIUS O. PERKINS.